United States Patent
Inaba et al.

(10) Patent No.: US 11,488,390 B2
(45) Date of Patent: Nov. 1, 2022

(54) MAP GENERATION DEVICE, RECORDING MEDIUM AND MAP GENERATION METHOD

(71) Applicant: TOYOTA JIDOSHA KABUSHIKI KAISHA, Toyota (JP)

(72) Inventors: Chihiro Inaba, Nerima-ku (JP); Akie Sakiyama, Shinjuku-ku (JP); Makoto Tamura, Oota-ku (JP); Toshiyuki Hagiya, Shiki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 159 days.

(21) Appl. No.: 17/125,154

(22) Filed: Dec. 17, 2020

(65) Prior Publication Data
US 2021/0248387 A1    Aug. 12, 2021

(30) Foreign Application Priority Data

Feb. 6, 2020    (JP) .............................. JP2020-018739

(51) Int. Cl.
*G06T 7/70* (2017.01)
*G06K 9/62* (2022.01)
*G06V 20/56* (2022.01)
*G09B 29/10* (2006.01)

(52) U.S. Cl.
CPC ........... *G06V 20/56* (2022.01); *G06K 9/6218* (2013.01); *G06T 7/70* (2017.01); *G09B 29/106* (2013.01); *G06T 2207/30252* (2013.01)

(58) Field of Classification Search
None
See application file for complete search history.

(56) References Cited

U.S. PATENT DOCUMENTS

2020/0193643 A1* 6/2020 Hess ..................... G01S 5/0284

FOREIGN PATENT DOCUMENTS

| JP | 2004-213238 A | 7/2004 |
| JP | 2007-3568 A | 1/2007 |
| JP | 2008-39687 A | 2/2008 |
| JP | 2019-105789 A | 6/2019 |

* cited by examiner

*Primary Examiner* — Idowu O Osifade
(74) *Attorney, Agent, or Firm* — Oblon, McClelland, Maier & Neustadt, L.L.P.

(57) ABSTRACT

A map generation device that detects a pre-specified target object based on image information obtained by imaging from each of a plurality of vehicles; estimates position information that is an absolute position of the detected target object, the position information being estimated based on a relative position of the detected target object and each vehicle imaging the image information in which the target object is detected, and position information that is an absolute position of each vehicle at a time of imaging the target object; and integrates matching target objects included in a plurality of estimated target objects, the matching target objects being integrated based on the position information of the respective target objects and the image information of the images in which the respective target objects are included, and a number and positions of the target objects being specified.

18 Claims, 16 Drawing Sheets

FIG.2
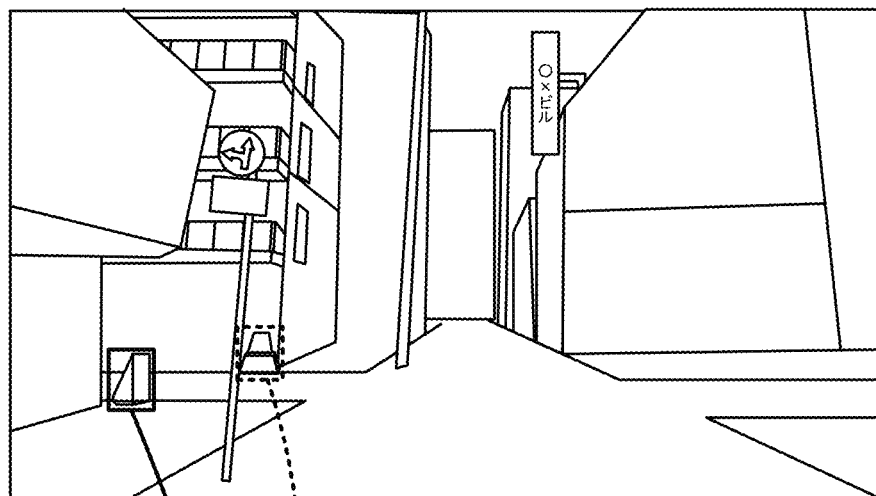
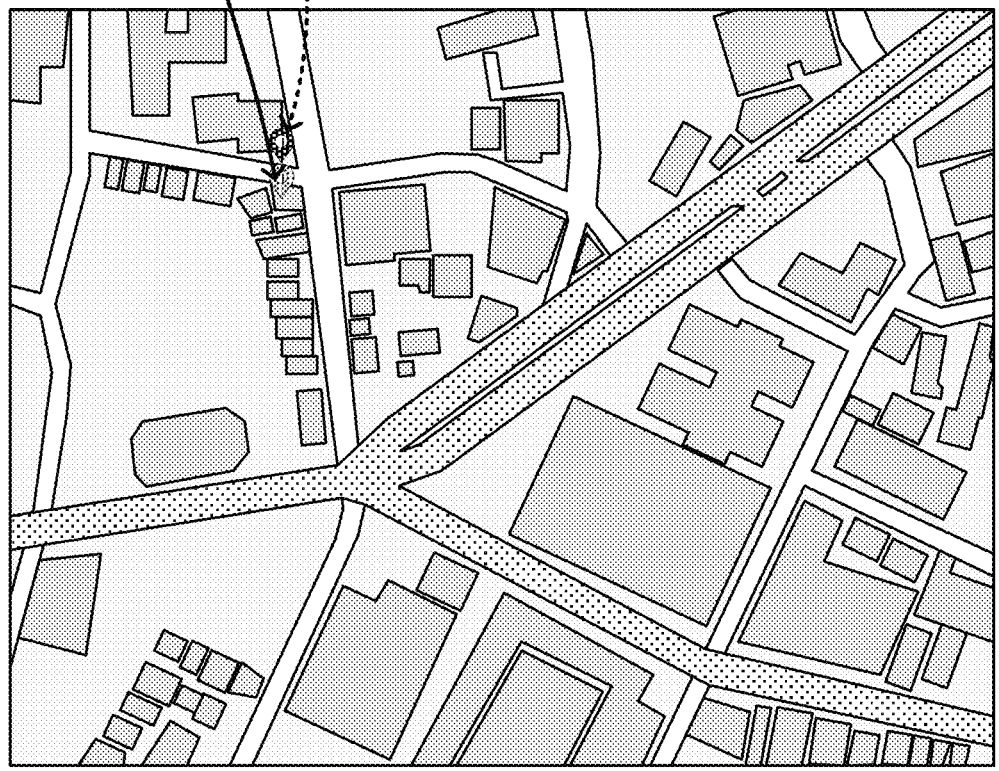

FIG.11
 XXXXX SIDEWALK SIGN
 YYYYY SIDEWALK SIGN
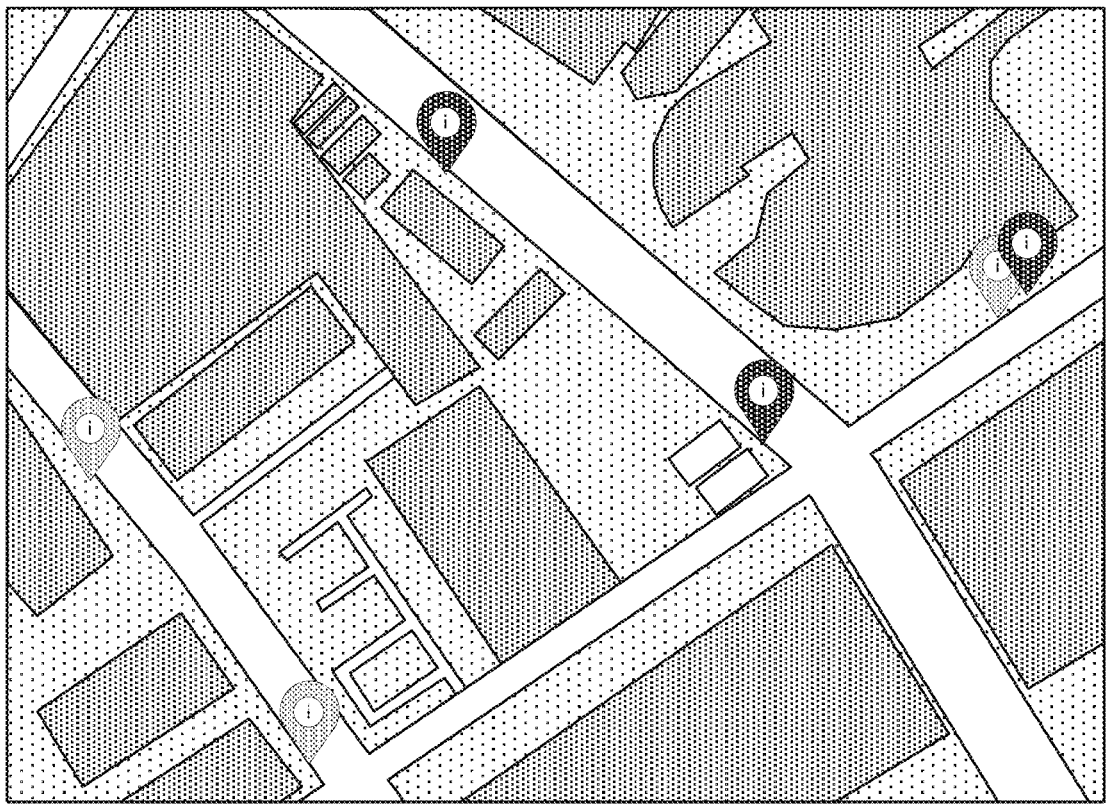

MAP GENERATION DEVICE, RECORDING MEDIUM AND MAP GENERATION METHOD

CROSS-REFERENCE TO RELATED APPLICATION

This application is based on and claims priority under 35 USC 119 from Japanese Patent Application No. 2020-018739 filed on Feb. 6, 2020, the disclosure of which is incorporated by reference herein.

BACKGROUND

Technical Field

The present disclosure relates to a map generation device that uses image data imaged from vehicles to generate maps of road vicinity installations, to a recording medium recording a map generation program and to a map generation method.

Background Art

Japanese Patent Application Laid-Open (JP-A) No. 2008-039687 proposes a map generation system that may continuously update road map data with more useful content. More specifically, in the technology of JP-A No. 2008-039687, a new road determination component makes a determination as to whether a road being run on is a new road. When the road is a new road, a running path and images of vehicle surroundings imaged by an on-board camera during running along the new road are sent to a map administration device. The map administration device determines a shape of the new road from the running path and, by analyzing the images, determines more detailed information of the new road and what facilities are present in the vicinity of the new road.

However, although the technology of JP-A No. 2008-039687 may add and update shapes and facilities in the vicinity of the new road, there is scope for improvements to add and update arbitrary target objects such as road vicinity installations and the like on a pre-existing map.

SUMMARY

An aspect of the present disclosure is a map generation device that detects a pre-specified target object based on image information obtained by imaging from each of a plurality of vehicles; that estimates position information that is an absolute position of the detected target object, the position information being estimated based on a relative position of the detected target object and each vehicle imaging the image information in which the target object is detected, and position information that is an absolute position of each vehicle at a time of imaging the target object, and that integrates matching target objects included in a plurality of estimated target objects, the matching target objects being integrated based on the position information of the respective target objects and the image information of the images in which the respective target objects are included, and a number and positions of the target objects being specified.

BRIEF DESCRIPTION OF DRAWINGS

FIG. 2 is a view showing a situation in which detection target objects are detected and information about the detection target objects that are detected is added to a pre-existing map.

FIG. 11 is a view showing an example of a detection target object map in which detection target objects have been added to a map.

DESCRIPTION OF EMBODIMENTS

Figure 1:
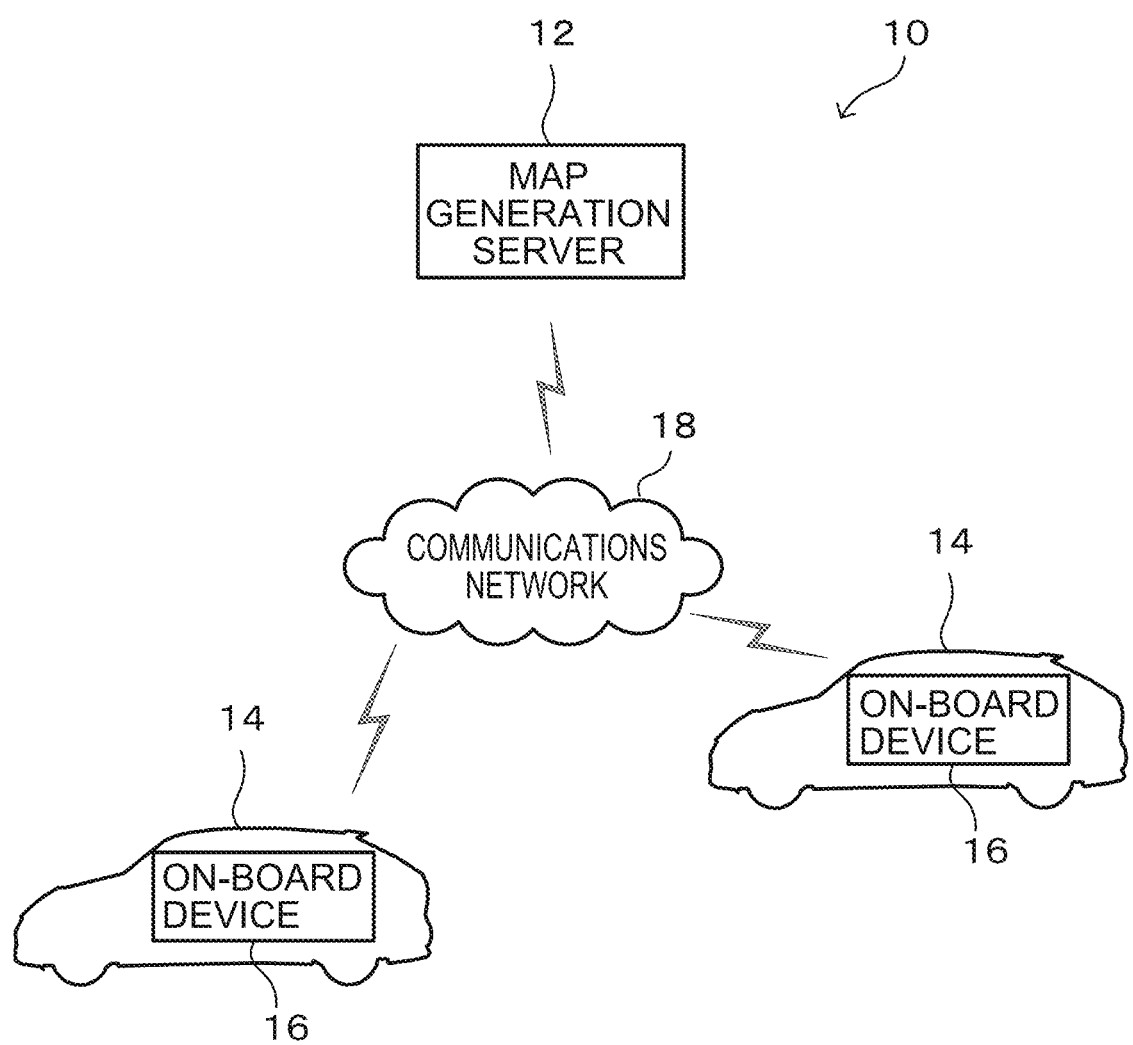
FIG. 1 is a diagram showing schematic structures of a map generation system according to a present exemplary embodiment.

Below, an example of an embodiment of the present disclosure is described in detail with reference to the drawings. FIG. 1 is a diagram showing schematic structures of a map generation system according to the present exemplary embodiment.

As shown in FIG. 1, in a map generation system 10 according to the present exemplary embodiment, an on-board device 16, which is installed at a vehicle 14, and a map generation server 12, which is an example of a map generation device, are connected via a communications network 18. In the map generation system 10 according to the present exemplary embodiment, image information obtained by imaging from plural the vehicles 14 is transmitted to the map generation server 12. The map generation server 12 carries out processing to detect arbitrary target objects, such as road vicinity installations and the like, in the image information imaged from the vehicles 14, and to add and update the target objects on a pre-existing map. For example, as illustrated in FIG. 2, processing is carried out to detect target objects that are detection target objects and add information of the detection target objects that are detected to a pre-existing map. Where an example situation is described in the descriptions below, this is a situation in which the target objects are sidewalk signs, but target objects are not limited to sidewalk signs. For example, target objects other than sidewalk signs may be detected, such as banners at convenience stores, garbage cans on the street, school zones, locations of electric charging stations, locations of construction work or road damage, and so forth, and positions and numbers thereof may be added to maps.

Figure 3:
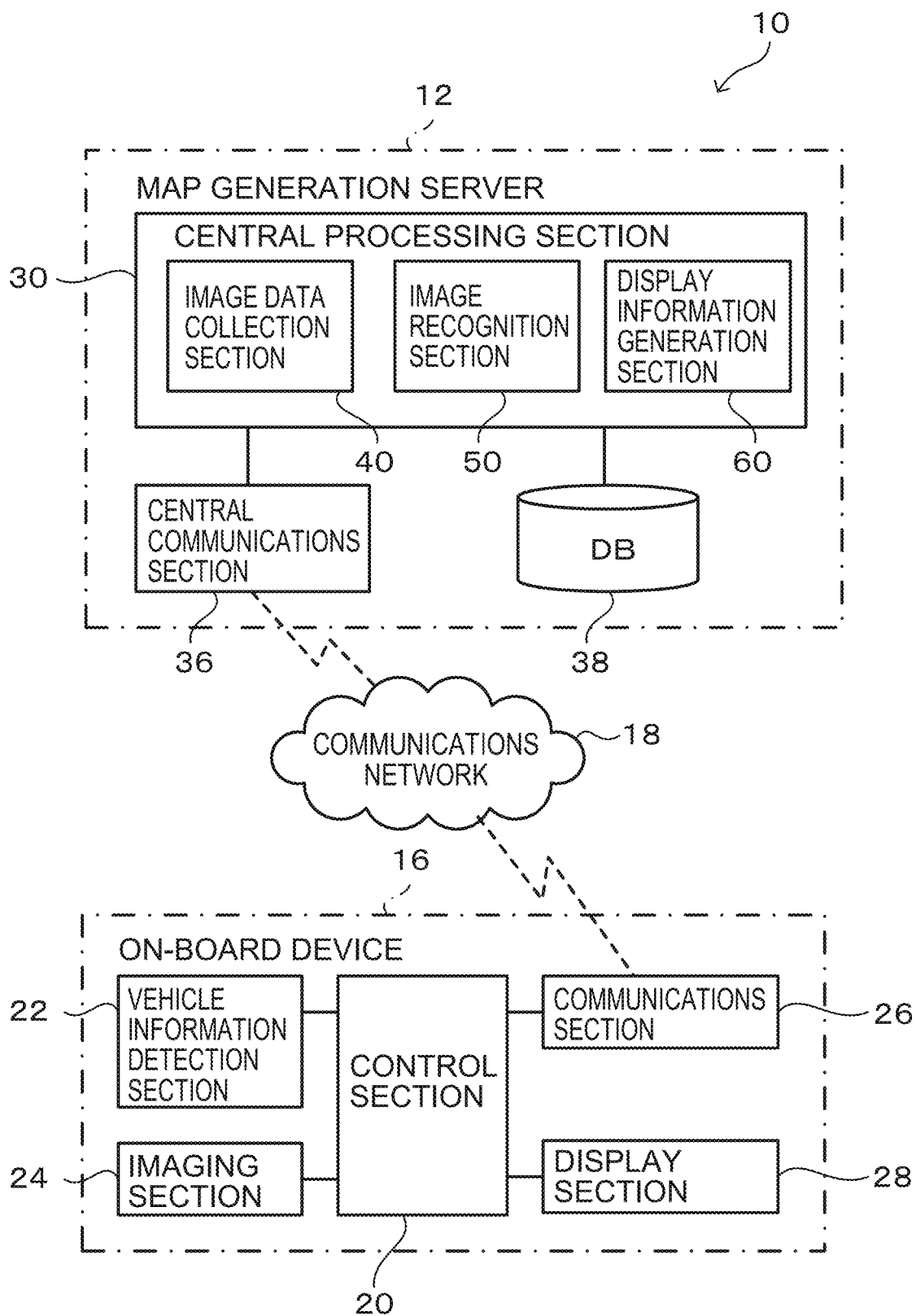
FIG. 3 is a block diagram showing structures of an on-board device and a map generation server of the map generation system according to the present exemplary embodiment.

FIG. 3 is a block diagram showing structures of the on-board device 16 and map generation server 12 of the map generation system 10 according to the present exemplary embodiment.

The on-board device 16 is equipped with a control section 20, a vehicle information detection section 22, an imaging section 24, a communications section 26 and a display section 28.

The vehicle information detection section 22 detects vehicle information relating to the vehicle 14, including at least position information of the vehicle 14. In addition to the position information, the vehicle information that may be detected includes, for example, vehicle speed, acceleration, steering angle, throttle opening, route and the like. More specifically, the vehicle information detection section 22 may employ plural types of sensor and equipment that acquire information representing conditions of the environment in the vicinity of the vehicle 14. Examples of sensors and equipment that can be mentioned include sensors installed at the vehicle 14, such as a vehicle speed sensor, an acceleration sensor and the like, a global navigation satellite system (GNSS) device, on-board communication equipment, a navigation system, a radar apparatus and so forth. The GNSS device receives GNSS signals from plural GNSS satellites and locates the position of the vehicle 14. The greater the number of GNSS signals the GNSS device can receive, the better the accuracy of locating. The on-board communication equipment is a communications device that, via the communications section 26, performs at least one of vehicle-to-vehicle communications with others of the vehicle 14 and road-to-vehicle communications with roadside equipment. The navigation system includes a geographic information storage section that stores geographic information. Processing that displays the position of the present vehicle on a map and gives guidance on a route to a destination is conducted on the basis of position information obtained from the GNSS device and the geographic information stored in the geographic information storage section. The radar apparatus includes plural radars with mutually different detection ranges. The radar apparatus detects pedestrians, others of the vehicles 14 and the like in the vicinity of the present vehicle 14, and acquires relative distances and relative speeds of the detected bodies relative to the present vehicle 14. The radar apparatus incorporates a processing device that processes location results of bodies in the vicinity. On the basis of changes in the relative positions and relative speeds of the individual bodies included in the location results over plural sets of the most recent location results, and the like, the processing equipment removes noise and excludes roadside objects such as guard rails and the like from monitoring targets, and tracks monitoring target bodies such as pedestrians, the other vehicles 14 and the like. The radar apparatus outputs information on the relative positions, relative speeds and the like of the individual monitoring target bodies.

The imaging section 24 is provided in a vehicle cabin. The imaging section 24 images the vicinity of the vehicle 14 and obtains image information representing captured images. For example, the imaging section 24 is provided at the vehicle 14 and images the vehicle vicinity to at least one of the front, sides and rear of the vehicle 14. The imaging section 24 may also image the vehicle cabin interior.

The communications section 26 establishes communications with the map generation server 12 via the communications network 18, and transmits/receives information such as image information obtained by imaging by the imaging section 24, vehicle information detected by the vehicle information detection section 22, and the like.

The display section 28 provides various kinds of information to a vehicle occupant by displaying the various kinds of information. For example, the display section 28 displays map information provided from the navigation system and the like.

The on-board device 16 includes an ordinary microcomputer including a central processing unit (CPU), which is an example of a hardware processor, read-only memory (ROM), random access memory (RAM) and the like, which correspond to memory, and so forth. The CPU loads a program stored in the ROM or RAM and executes the program. Thus, the CPU functions as the control section 20. The on-board device 16 includes a storage device such as a hard disk drive (HDD) or the like. The on-board device 16 performs processing to save image information representing captured images that are imaged by the imaging section 24 and vehicle information detected by the vehicle information detection section 22 at times of imaging of the images, and to upload the information to the map generation server 12 and so forth.

Meanwhile, the map generation server 12 is equipped with a central processing section 30, a central communications section 36 and a database (DB) 38.

Figure 16:
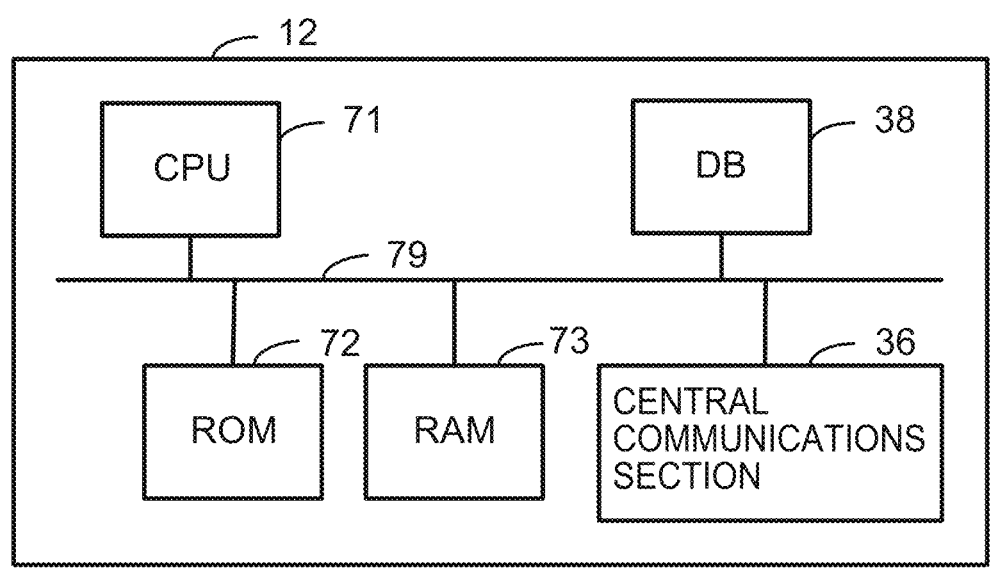
FIG. 16 shows a hardware structure diagram of the map generation server.

As illustrated in FIG. 16, the map generation server 12 includes an ordinary microcomputer including a CPU 71, which is an example of a hardware processor, and ROM 72, RAM 73 and the like corresponding to memory. The CPU 71 loads a program stored in the ROM 72 or the RANI 73 and executes the program. Thus, the CPU 71 functions as the central processing section 30, which is to say, as an image data collection section 40, an image recognition section 50, and a display information generation section 60. The central processing section 30 performs processing to collect the image information and vehicle information sent from the on-board devices 16 in the database 38 and build a database. The central processing section 30 also performs processing to detect arbitrary target objects such as road vicinity installations and the like on the basis of the image information, and to add and update the target objects on a pre-existing map. The functions of the central processing section 30 are implemented by executing a program stored in ROM or the like.

The image data collection section 40 carries out the processing to aggregate image information and vehicle information transmitted from the on-board devices 16 and collect this information in the database 38.

The image recognition section 50 carries out the processing to detect arbitrary target objects such as road vicinity installations on the basis of the image information and vehicle information collected in the database 38.

The display information generation section 60 carries out processing to estimate positions of the target objects detected by the image recognition section 50, to judge which of the target objects are matching target objects (the same target object) and detect positions and numbers of the target objects, and to add or remove and update target objects in pre-existing map information.

The central communications section 36 establishes communications with the on-board devices 16 via the communications network 18, and transmits and receives various kinds of information such as image information, vehicle information and the like.

The database 38 receives image information and vehicle information from the on-board devices 16, and collects both the received image information and vehicle information.

In the map generation system 10 described above, image information imaged by the imaging section 24 of each on-board device 16 is transmitted to the map generation server 12 together with vehicle information that includes at least position information, and is collected in the database 38.

Figure 4:
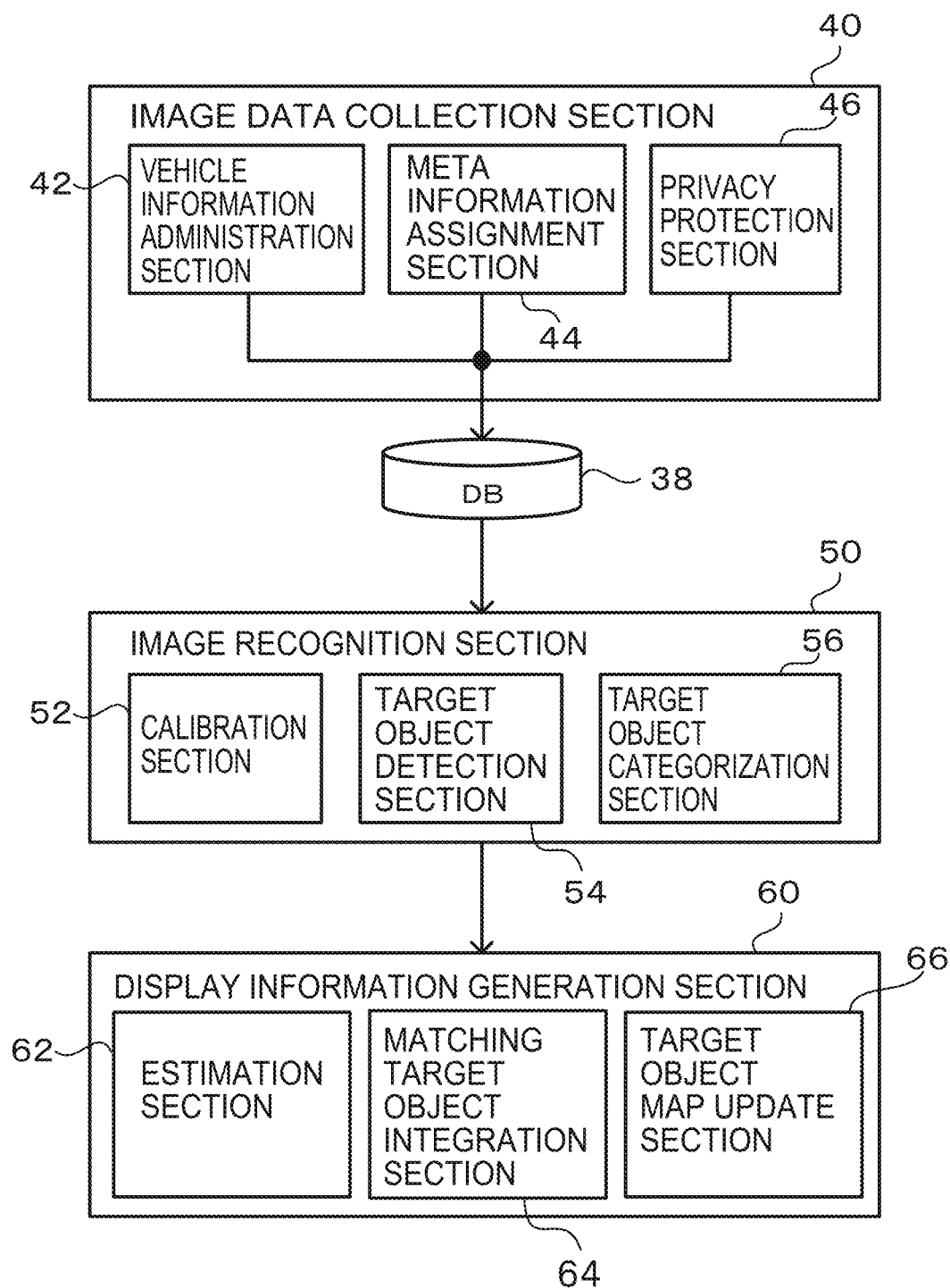
FIG. 4 is a functional block diagram showing detailed functions of a central processing section of the map generation server of the map generation system according to the present exemplary embodiment.

Now, the functions of the above-described image data collection section 40, image recognition section 50 and display information generation section 60 of the central processing section 30 are described in detail. FIG. 4 is a functional block diagram showing detailed functional structures of the central processing section 30 of the map generation server 12 of the map generation system 10 according to the present exemplary embodiment.

The image data collection section 40 features the functions of a vehicle information administration section 42, a meta information assignment section 44 and a privacy protection section 46.

The vehicle information administration section 42 acquires from the central communications section 36 the image information and vehicle information received from each on-board device 16, and associates the vehicle information including position information and other information with the image information received from the on-board device 16.

The meta information assignment section 44 judges imaging conditions from the vehicle information obtained from the vehicle (for example, vehicle speed, acceleration and the like) or from sharpness, illumination and the like of the images themselves, and collects the imaging conditions with the image information.

The privacy protection section 46 performs processing to delete information that may compromise privacy (for example, faces, information that may identify individuals and so forth) or put such information into an unreadable state (for example, mosaic processing or the like).

The image recognition section 50 features the functions of a calibration section 52, a target object detection section 54 that serves as a detection section, and a target object categorization section 56 that serves as a categorization section.

The calibration section 52 uses previously known target objects to perform calibration automatically when calibration information of the imaging section 24 is not provided (parameters of the imaging section 24 and the like such as, for example, mounting positions of cameras, angles, information on optical system distortion and so forth). The calibration may be performed using, as an example of a previously known target object, paint on a road such as a pedestrian crossing or the like or, alternatively, a known road width, detected white lines or the like. When calibration is carried out before a time of installation of the imaging section 24 or the like and calibration information is provided, this calibration is not performed by the calibration section 52 but the calibration information is acquired from the vehicle information administration section 42.

The target object detection section 54 detects pre-specified target objects (for example, arbitrary target objects such as road vicinity installations or the like) from the image information collected in the database 38. The target object detection section 54 utilizes, for example, a deep learning technology for object detection such as You Only Look Once (YOLO), Single Shot Multibox Detector (SSD) or the like to detect the target objects from the image information. For example, when the target objects to be detected are sidewalk signs, operation staff generate annotation information by selecting frames in which sidewalk signs appear from video images imaged by the imaging sections 24 and putting boxes around regions in which the sidewalk signs appear. The generated annotation information is used to build a model for detecting sidewalk signs, and this model is used to detect the target objects.

The target object categorization section 56 categorizes types of the target objects detected by the target object detection section 54. In the present exemplary embodiment, the target object categorization section 56 categorizes sidewalk signs by messages on the sidewalk signs. The target object categorization section 56 utilizes, for example, a deep learning technology for image recognition such as a VGG19 convolutional neural network, Inception or the like to categorize the types of target objects. The target object categorization section 56 may be integrated with the target object detection section 54. For example, operation staff generate annotation information by selecting frames in which sidewalk signs appear from video images, putting boxes around regions in which sidewalk signs appear and selecting types of message. The generated annotation information is used to build a model for detecting sidewalk signs, and this model is used to detect the target objects and categorize the types of the messages.

The display information generation section 60 features the functions of an estimation section 62, a matching target object integration section 64 that serves as a specification section, and a target object map update section 66 that serves as a map update section.

The estimation section 62 estimates position information of a target object, as a latitude and longitude, from the calibration information of the imaging section 24, a detection position of the target object in an image, and the position information of the vehicle included in the vehicle information. More specifically, the estimation section 62 converts image information as illustrated by the example in FIG. 5A to a bird's eye view as illustrated by the example in FIG. 5B, and estimates the position information of a sidewalk sign that is the target object. That is, on the basis of a known length, such as the length of rectangles of a pedestrian crossing as illustrated by the example in FIG. 5C or the like, the estimation section 62 estimates a relative distance from the position of the vehicle 14 to the detected target object in the converted bird's eye view, and the estimation section 62 uses the position information of the vehicle 14 included in the vehicle information to estimate the position of the sidewalk sign as a latitude and longitude. The estimation section 62 may estimate the relative position more accurately by taking account of attitude information of the vehicle, such as roll, pitch and yaw or the like.

Figure 6:
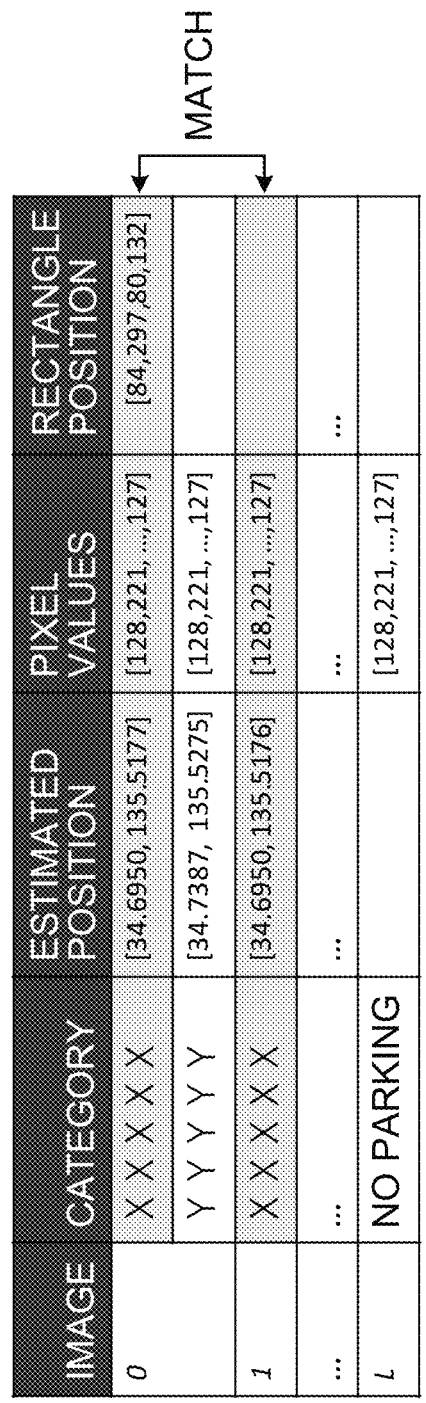
FIG. 6 is a diagram showing an example of categorization results and estimated positions for respective types of detection target objects that are detected.

In order to integrate previous target recognition results from the image recognition section 50 and display results on the map, the matching target object integration section 64 performs processing to recognize which of detected target objects are matching target objects, to integrate the matching target objects, and hence to specify a number and positions of the target objects. For example, when an example of categorization results for each type of detected sidewalk sign and estimated positions is as in FIG. 6, sidewalk signs whose estimated positions are at the same position or within a pre-specified tolerance range are treated as matching sidewalk signs and integrated to a single target object. More specifically, feature quantities of images (for example, feature quantities such as local feature quantities and the like) are computed, clustering is implemented, and sidewalk signs to be integrated are judged from feature quantity differences. Alternatively, when sidewalk signs of the same type are present within matching frame images, detected target objects of which relative distances from the positions of the vehicles 14 to the target objects are less than a pre-specified distance and an overlap of the detected target objects in the images is at least a pre-specified threshold are treated as the same sidewalk sign and are integrated to a single object, and detected target objects of which the relative distances are at least the pre-specified distance and a distance between the target objects is less than a pre-specified threshold are treated as the same sidewalk sign and are integrated to a single object.

When a target object such as a road vicinity installation or the like is removed or such and the target object is not detected for a pre-specified period or detection count, the target object map update section 66 deletes the target object from the database 38. When a new target object continues to be successively detected, the target object map update section 66 determines that the target object is a new installation and updates the map. Thus, the target object map update section 66 does not update the map when a target object is detected one time or not detected one time, because a target object may be concealed by vehicles, pedestrians and the like in the vicinity and not detected, a target object may be not detected due to illumination conditions, and so forth.

Now, an example of processing that is carried out by the map generation system 10 according to the present exemplary embodiment described above is described.

Figure 7:
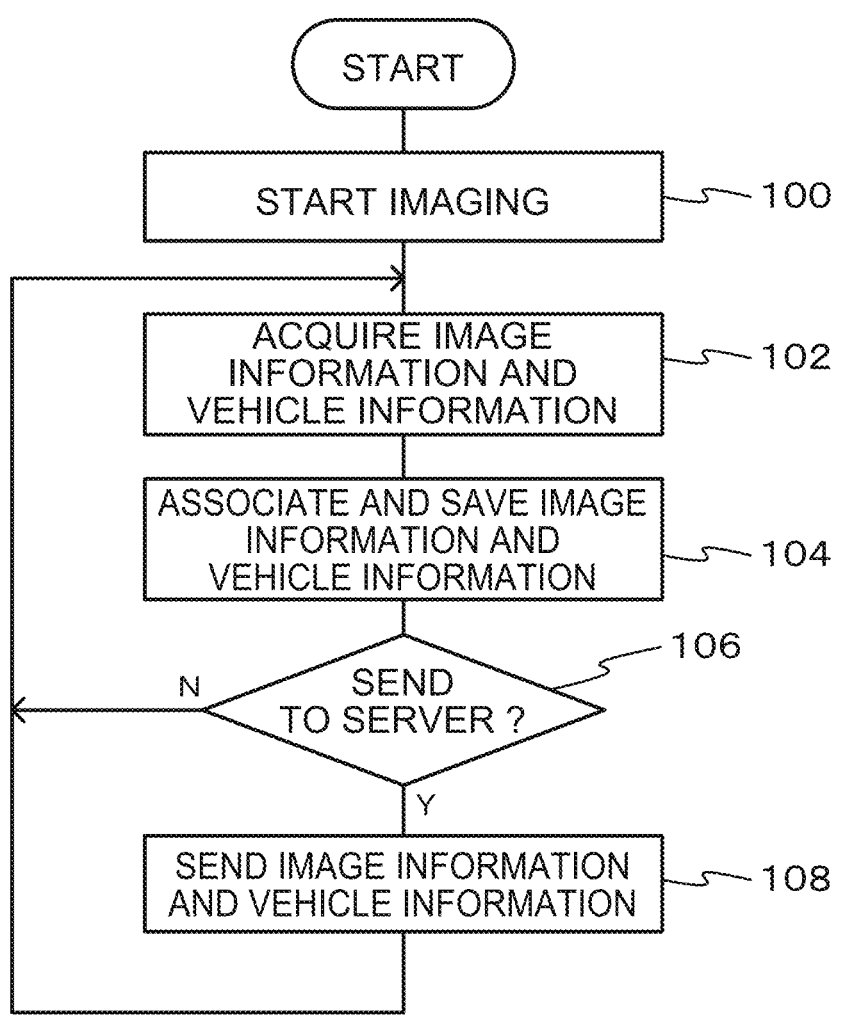
FIG. 7 is a flowchart showing an example of a flow of processing that is carried out by a control section of the on-board device of the map generation system according to the present exemplary embodiment.

First, processing that is carried out by each on-board device 16 of the map generation system 10 according to the present exemplary embodiment is described. FIG. 7 is a flowchart showing an example of a flow of processing that is carried out by the control section 20 of the on-board device 16 of the map generation system 10 according to the present exemplary embodiment. The processing in FIG. 7, for example, starts when an ignition switch or the like is turned on and ends when the ignition switch is turned off.

In step 100, the control section 20 controls the imaging section 24 to start imaging of the vicinity of the vehicle 14 with the imaging section 24, and the control section 20 proceeds to step 102.

In step 102, the control section 20 acquires image information and vehicle information, and the control section 20 proceeds to step 104. That is, the control section 20 acquires from the imaging section 24 image information obtained by the imaging by the imaging section 24, and the control section 20 acquires vehicle information including position information detected by the vehicle information detection section 22.

In step 104, the control section 20 associates and saves the acquired image information and vehicle information, and the control section 20 proceeds to step 106.

In step 106, the control section 20 makes a determination as to whether to transmit the image information and vehicle information to the map generation server 12. This determination is, for example, a determination as to whether a pre-specified time has been reached. Alternatively, this determination is a determination as to whether a saved information amount of the image information and vehicle information is above a pre-specified threshold. Alternatively again, this determination is a determination as to whether a remaining storage capacity at the control section 20 is below a pre-specified capacity. When the result of this determination is affirmative, the control section 20 proceeds to step 108, and when the result is negative, the control section 20 returns to step 102 and repeats the processing described above.

In step 108, the control section 20 transmits the image information and vehicle information to the map generation server 12, and the control section 20 returns to step 102 and repeats the processing described above.

Now, processing that is carried out by the map generation server 12 of the map generation system 10 according to the present exemplary embodiment is described.

Figure 8:
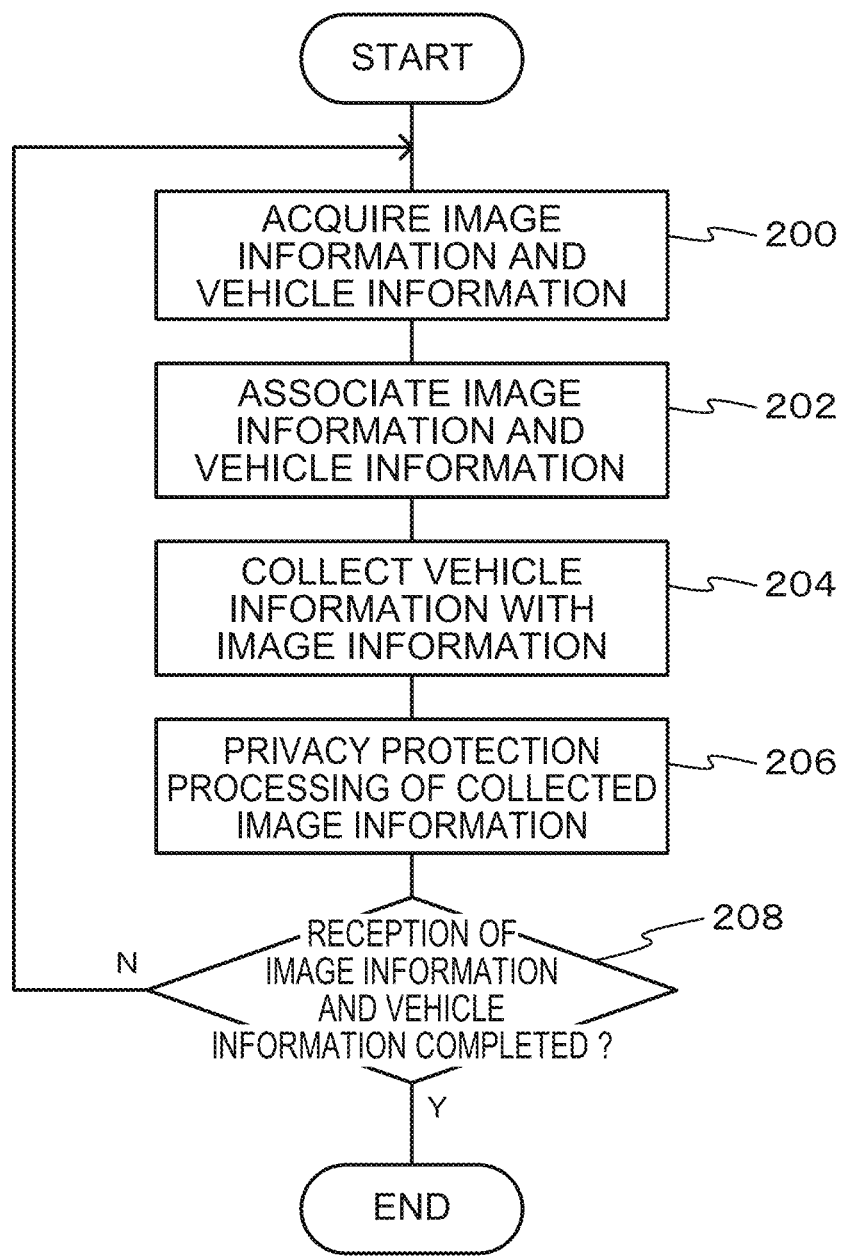
FIG. 8 is a flowchart showing an example of a flow of processing that is carried out by a central processing section (an image data collection section) of the map generation server of the map generation system according to the present exemplary embodiment when image information and vehicle information are sent from the on-board device.

Processing that is carried out when image information and vehicle information are transmitted from the on-board device 16 to the map generation server 12 is described. FIG. 8 is a flowchart showing an example of a flow of processing that is carried out by the central processing section 30 (the image data collection section 40) of the map generation server 12 of the map generation system 10 according to the present exemplary embodiment when image information and vehicle information are transmitted from the on-board device 16. The processing in FIG. 8 starts when image information and vehicle information from any of the plural vehicles 14 are transmitted to the map generation server 12 from the on-board device 16 of the vehicle 14.

In step 200, the vehicle information administration section 42 acquires from the central communications section 36 the image information and vehicle information received from the on-board device 16, and the central processing section 30 proceeds to step 202.

In step 202, the vehicle information administration section 42 associates the image information and vehicle information received from the on-board device 16, and the image data collection section 40 proceeds to step 204. That is, the image information is linked with the vehicle information including position information and other information.

In step 204, the meta information assignment section 44 collects the image information and vehicle information in the database 38, and the image data collection section 40 proceeds to step 206. More specifically, the meta information assignment section 44 determines imaging conditions from the vehicle information obtained from the vehicle (for example, vehicle speed, acceleration and the like) or from sharpness, illumination and the like of the images themselves, and collects the imaging conditions with the image information.

In step 206, the privacy protection section 46 applies privacy protection processing to the image information collected in the database 38, and the image data collection section 40 proceeds to step 208. That is, the privacy protection section 46 performs processing to delete information that may compromise privacy (for example, faces, information capable of identifying individuals and so forth) or putting such information into an unreadable state (for example, mosaic processing or the like).

In step 208, the image data collection section 40 makes a determination as to whether all the image information and vehicle information transmitted from the on-board device 16 have been received and the above-described processing has been completed. When the result of this determination is negative, the image data collection section 40 returns to step 200 and repeats the processing described above, and when the result is affirmative, the image data collection section 40 ends this sequence of processing.

Figure 9:
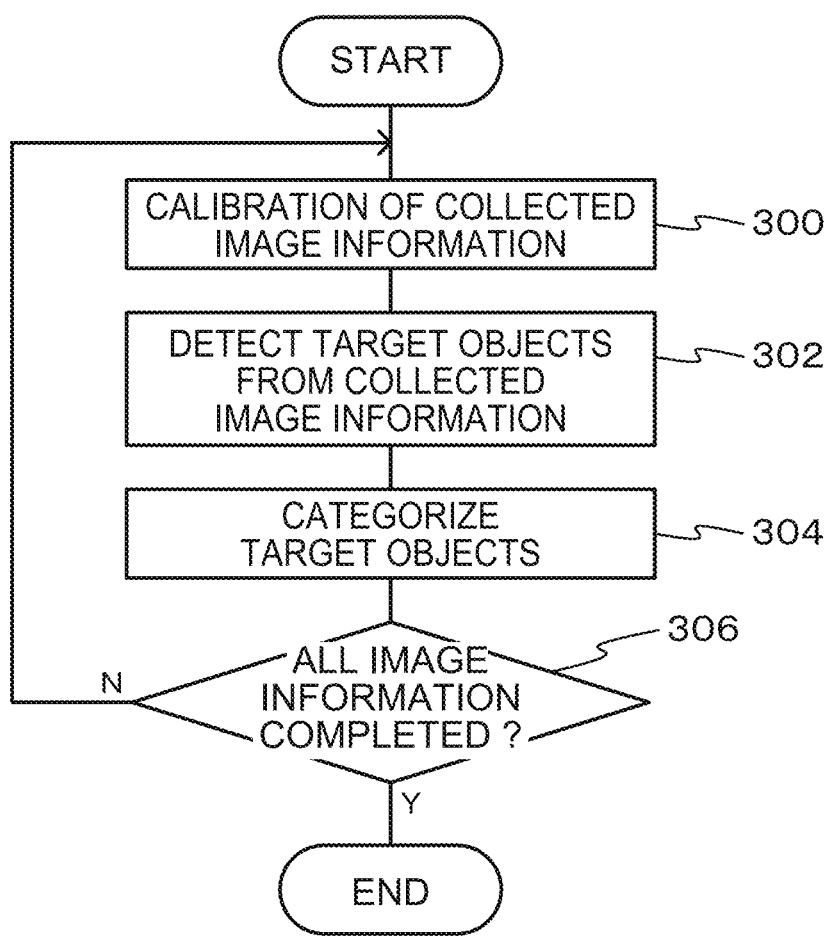
FIG. 9 is a flowchart showing an example of a flow of processing that is carried out by the central processing section (an image recognition section) of the map generation server of the map generation system according to the present exemplary embodiment after the image information and vehicle information have been received from the on-board device and collected in a database.

Now, processing that is carried out after the image information and vehicle information from the on-board device 16 have been received and collected in the database 38 is described. FIG. 9 is a flowchart showing an example of processing that is carried out by the central processing section 30 (the image recognition section 50) of the map generation server 12 of the map generation system 10 according to the present exemplary embodiment after the image information and vehicle information have been received from the on-board device 16 and collected in the database 38. The processing in FIG. 9 starts, for example, after the processing in FIG. 8 ends.

In step 300, when the calibration information of the imaging section 24 (parameters of the imaging section 24 and the like such as, for example, an imaging position, angle, optical system distortion information and so forth) is not provided, the calibration section 52 uses known target objects to perform calibration, and the image recognition section 50 proceeds to step 302. For example, the calibration section 52 performs calibration using paint on a road such as a pedestrian crossing or the like or, alternatively, a known road width, detected white lines or the like. When calibration is carried out before a time of installation of the imaging section 24 or the like and calibration information is provided, this calibration is not performed by the calibration section 52 but the calibration information is acquired from the vehicle information administration section 42.

In step 302, the target object detection section 54 detects target objects in the image information collected in the database 38, and the image recognition section 50 proceeds to step 304. That is, as target objects, the target object detection section 54 detects sidewalk signs from the image information collected in the database 38. The target object detection section 54 utilizes, for example, a deep learning technology for object detection such as YOLO, SSD or the like to detect the target objects from the image information.

In step 304, the target object categorization section 56 categorizes types of the target objects, and the image recognition section 50 proceeds to step 306. That is, the target object categorization section 56 categorizes the types of the target objects detected by the target object detection section 54. More specifically, the target object categorization section 56 categorizes sidewalk signs by what messages are on the sidewalk signs. The target object categorization section 56 utilizes, for example, a deep learning technology for image recognition such as a VGG19 convolutional neural network, Inception or the like to categorize the types of the sidewalk signs.

In step 306, the image recognition section 50 makes a determination as to whether the above-described processing has been completed for all image information collected in the database 38. When the result of this determination is negative, the image recognition section 50 returns to step 300 and repeats the processing described above, and when the result is affirmative, the image recognition section 50 ends this sequence of processing.

Figure 10:
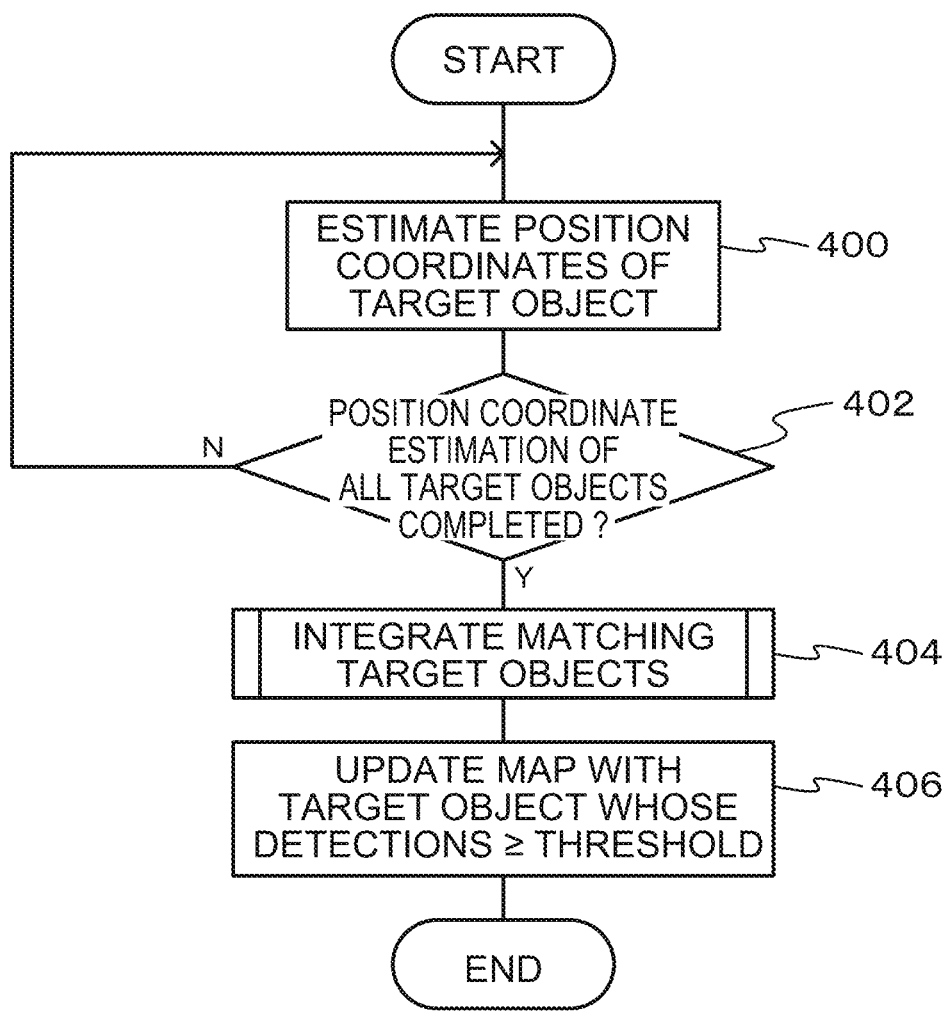
FIG. 10 is a flowchart showing an example of a flow of processing that is carried out by the central processing section (a display information generation section) of the map generation server of the map generation system according to the present exemplary embodiment after detection and categorization of target objects has been completed.

Now, processing that is carried out at the map generation server 12 after the detection and categorization of the target objects has ended is described. FIG. 10 is a flowchart showing an example of a flow of processing that is carried out by the central processing section 30 (the display information generation section 60) of the map generation server 12 of the map generation system 10 according to the present exemplary embodiment after the detection and categorization of the target objects has ended. The processing in FIG. 10 is carried out, for example, at intervals of a pre-specified period (for example, once per month, once per year or the like).

Figure 5A:
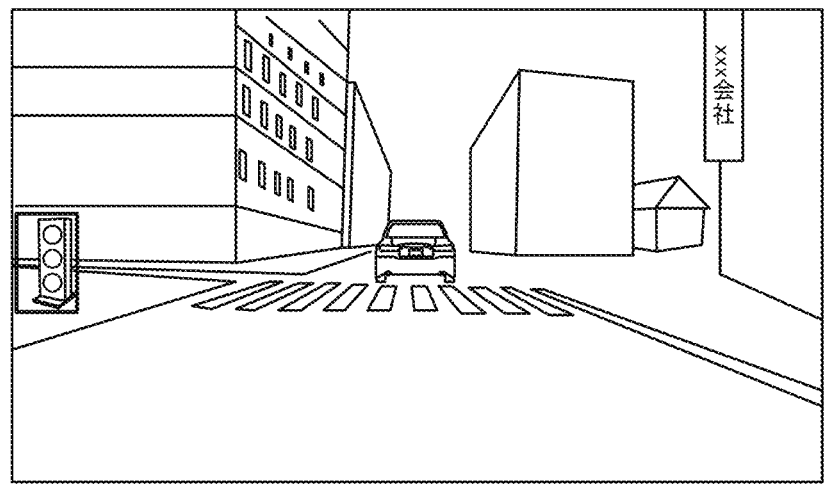
FIG. 5A is a view for explaining estimation of the position of a detection target object.
Figure 5B:
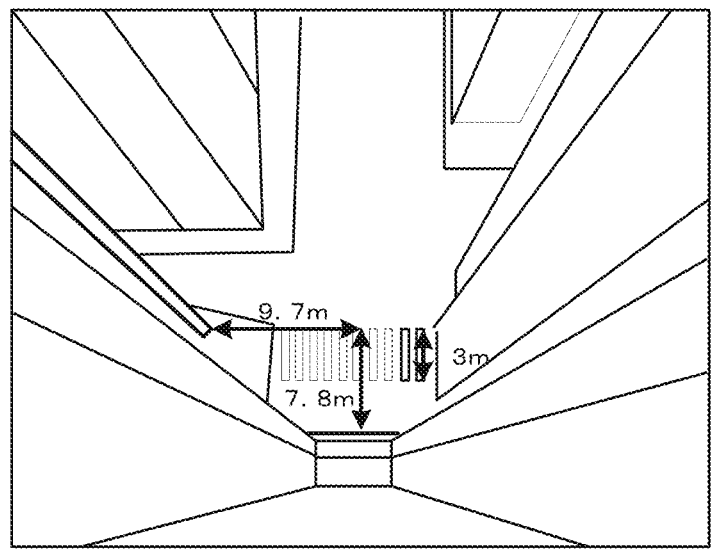
FIG. 5B is a view for explaining the estimation of the position of the detection target object.
Figure 5C:
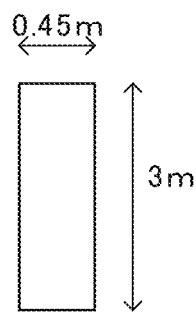
FIG. 5C is a view for explaining the estimation of the position of the detection target object.

In step 400, the estimation section 62 estimates position coordinates of a target object, and the display information generation section 60 proceeds to step 402. For example, as illustrated in FIG. 5A and FIG. 5B, the estimation section 62 converts image information to a bird's eye view and estimates the position of a sidewalk sign that is the target object. That is, from the converted bird's eye view, the estimation section 62 estimates a distance from the position of the vehicle 14 to the detected target object on the basis of a known length such as the length of the rectangles of a pedestrian crossing or the like, and the estimation section 62 uses the position information of the vehicle 14 included in the vehicle information to estimate the position of the sidewalk sign as a latitude and longitude.

In step 402, the estimation section 62 makes a determination as to whether the estimation of position coordinates has been completed for all the detected target objects. When the result of this determination is negative, the estimation section 62 returns to step 400 and repeats the processing described above, and when the result is affirmative, the estimation section 62 proceeds to step 404.

In step 404, the matching target object integration section 64 carries out matching target object integration processing, and the display information generation section 60 proceeds to step 406. That is, in order to integrate recognition results of previous target objects from the image recognition section 50 and display results on the map, the matching target object integration section 64 performs processing to recognize which of the detected target objects match with which others and integrate the matching target objects. Hence, the matching target object integration section 64 specifies a number and positions of target objects such as sidewalk signs or the like. The matching target object integration processing is described in more detail below.

In step 406, the target object map update section 66 carries out a map update for target objects with a detection count exceeding a threshold, and the display information generation section 60 ends this sequence of processing. That is, when a target object such as a road vicinity installation or the like is removed and that target object is not detected for a pre-specified period or detection count, the target object map update section 66 deletes the target object from the database 38, and when a new target object continues to be successively detected, the target object map update section 66 determines that the target object is newly installed and updates the map. If the map were updated when a target object is detected once, an erroneous detection might be included. Therefore, the map is updated when a target object is detected a plural number of times, and accuracy of the map of target objects may be improved. Hence, positions of sidewalk signs may be added and displayed on a map by an application or the like. For example, when a map is displayed by an application installed at a user's computer, portable terminal or the like, a sidewalk sign map in which sidewalk signs are added on the map may be displayed, as illustrated in FIG. 11.

Figure 12:
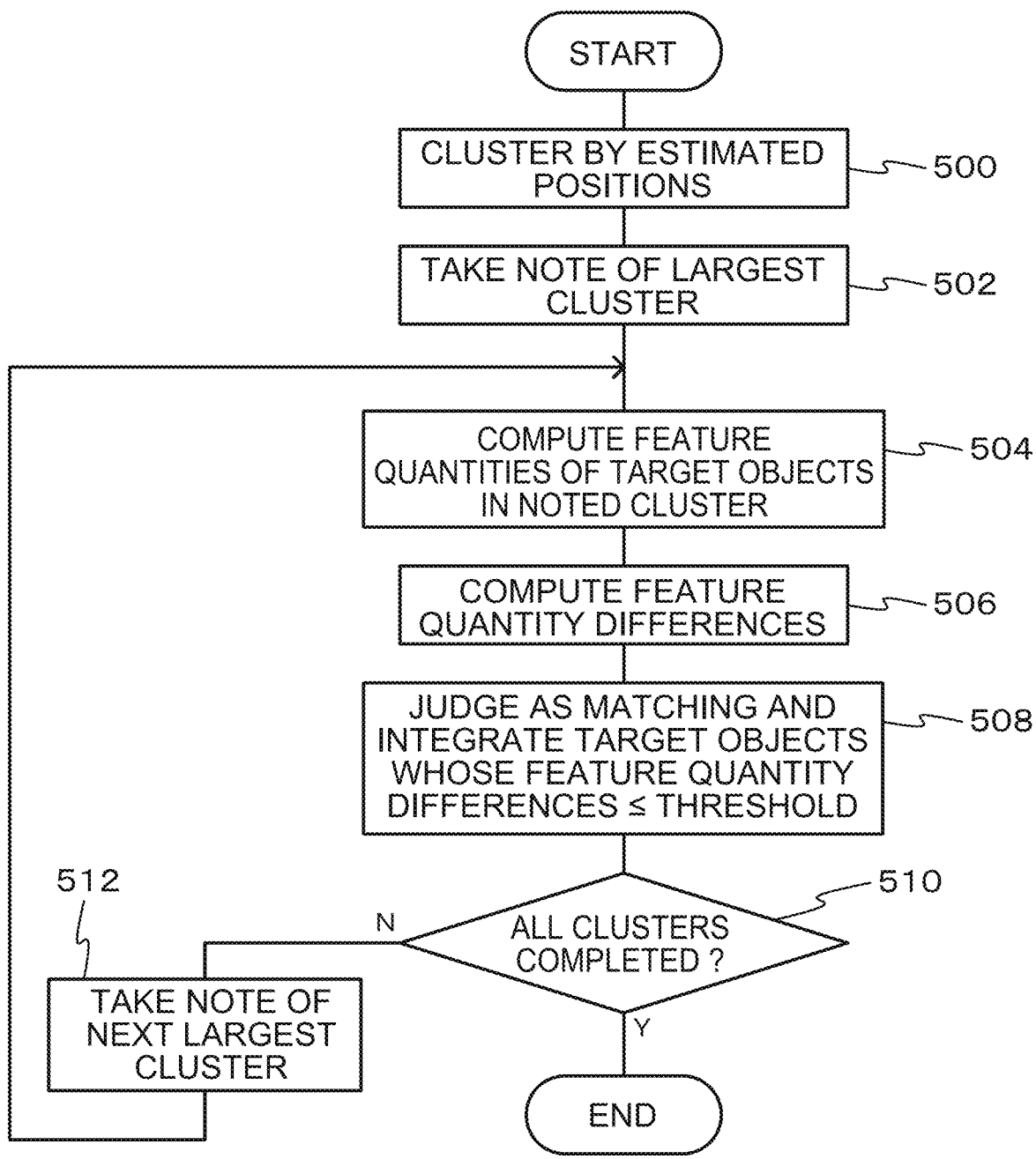
FIG. 12 is a flowchart showing a first example of a flow of matching target object integration processing that is carried out by a matching target object integration section.

Now, details of the matching target object integration processing carried out by the matching target object integration section 64 mentioned above are described. FIG. 12 is a flowchart showing a first example of a flow of matching target integration processing carried out by the matching target object integration section 64. The first example is an example in which an image matching technology is employed for determinations as to whether target objects are matching.

Figure 13A:
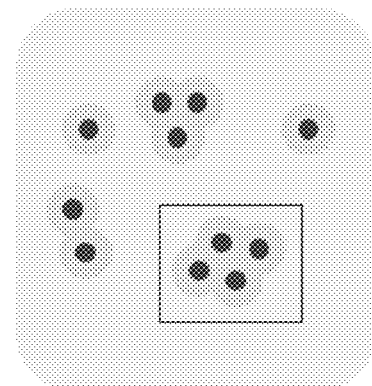
FIG. 13A is a view for explaining an example of clustering by estimated positions, computing feature quantities of images, judging matching target objects from feature quantity differences, and integrating matching target objects.

In step 500, the matching target object integration section 64 uses the positions estimated by the estimation section 62 to implement clustering, and the matching target object integration section 64 proceeds to step 502. For example, as illustrated in FIG. 13A, target objects are clustered by their estimated positions. Various publicly known methods may be employed as a method of clustering.

In step 502, the matching target object integration section 64 takes note of the largest cluster, and the matching target object integration section 64 proceeds to step 504. For example, in FIG. 13A, the matching target object integration section 64 takes note of the cluster with four target objects, which is the most numerous.

Figure 13B:
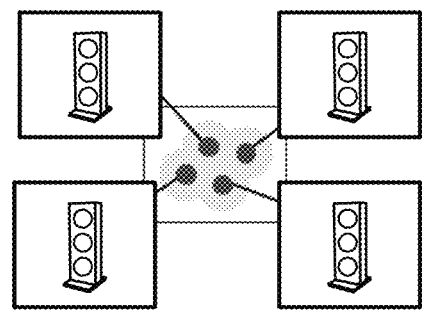
FIG. 13B is a view for explaining the example of clustering from the estimated positions, computing the feature quantities of the images, judging matching target objects from the feature quantity differences, and integrating the matching target objects.

In step 504, the matching target object integration section 64 computes feature quantities of the target objects in the noted cluster, and the central communications section 36 proceeds to step 506. For example, as illustrated in FIG. 13B, the matching target object integration section 64 computes local feature quantities of respective images of the four target objects.

Figure 13C:
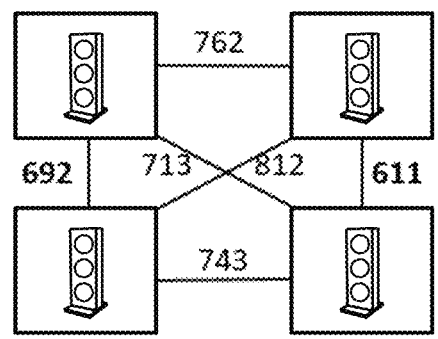
FIG. 13C is a view for explaining the example of clustering from the estimated positions, computing the feature quantities of the images, judging matching target objects from the feature quantity differences, and integrating the matching target objects.

In step 506, the matching target object integration section 64 computes feature quantity differences, and the matching target object integration section 64 proceeds to step 508. For example, as shown in FIG. 13C, the matching target object integration section 64 computes differences between a feature quantity in the target object images.

Figure 14:
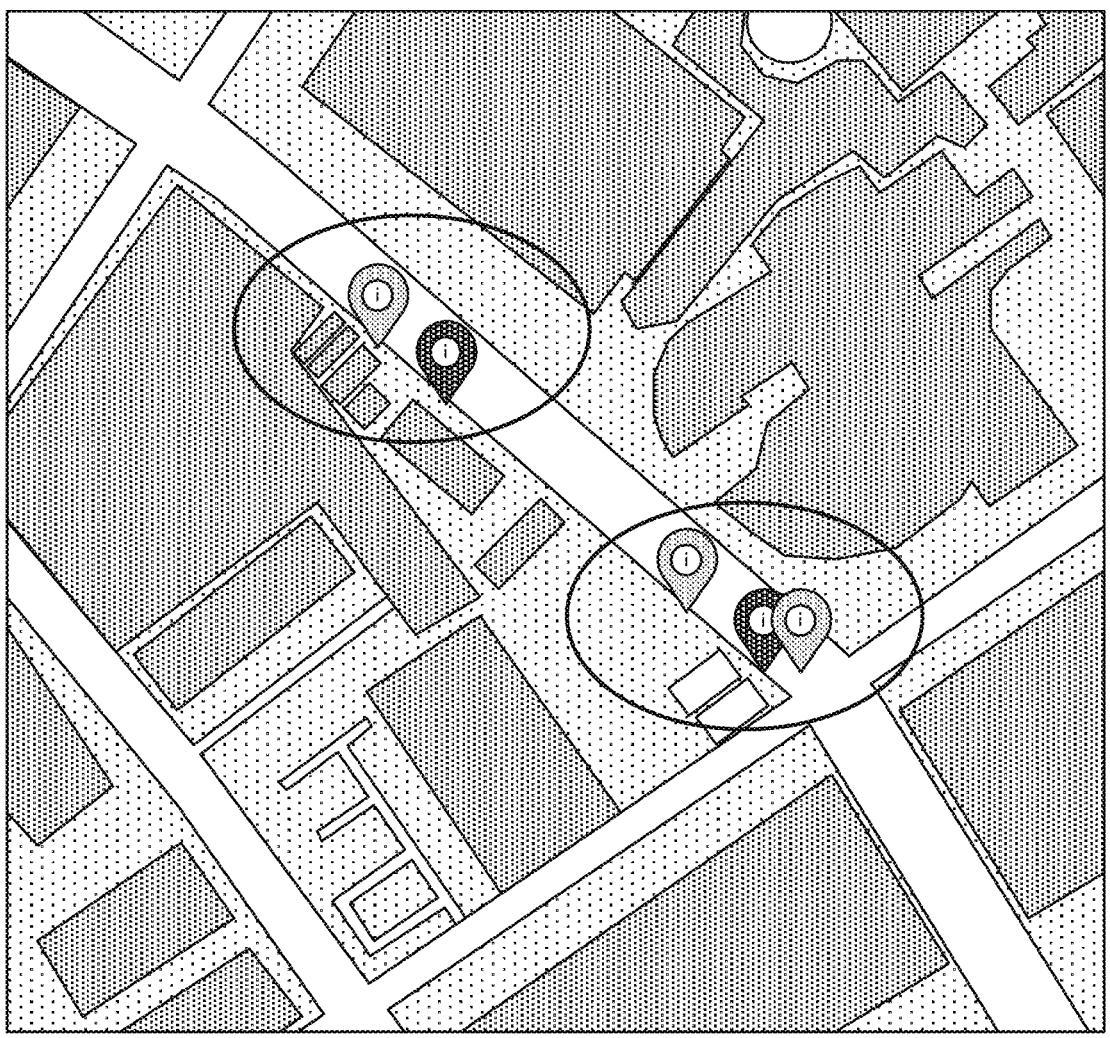
FIG. 14 is a view for explaining an example of judging and integrating matching target objects when position detection errors are large and the matching target objects are detected at different positions.

In step 508, the matching target object integration section 64 judges that target objects for which the feature quantity differences are less than or equal to a pre-specified threshold are matching and integrates these target objects, and the matching target object integration section 64 proceeds to step 510. Thus, although matching target objects may be detected at different positions when position detection errors are large, target objects that are contained within a circle as illustrated in FIG. 14 may be judged to be matching and integrated.

In step 510, the matching target object integration section 64 makes a determination as to whether this processing has been completed for all clusters. If the result of this determination is negative, the matching target object integration section 64 proceeds to step 512, and if the result is affirmative, the matching target object integration section 64 ends this sequence of processing.

In step 512, the matching target object integration section 64 takes note of the next largest cluster after the previous noted cluster, returns to step 504, and repeats the processing described above.

That is, in the processing of FIG. 12, the target objects are clustered (for example, clusters within a few tens of meters) by the estimated positions estimated by the estimation section 62. For the target objects within each cluster divided by the clustering, local feature quantities in images thereof are computed. Feature quantity differences (degrees of similarity) are computed, and target objects with small feature quantity differences are judged to be matching target objects. The target objects judged to be matching target objects are integrated to a single target object. Hence, a number and positions of the target objects may be specified.

In FIG. 12, a mode of clustering by estimated positions in step 500 is described, but this is not limiting. For example, step 500 may perform clustering by combining map dimensions (two dimensions) and feature quantity differences (for example, 256 dimensions). Thus, matching target objects may be integrated even when there are errors in the estimations of positions of the target objects. In this configuration, clustering is performed with weightings being assigned to the map dimensions and the feature quantity difference dimensions. Furthermore, two dimensions—the estimated latitude and longitude of the target objects—may be employed as the estimated positions of the target objects, or four dimensions may be employed as the estimated positions—the latitude and longitude of the position of the present vehicle, and the position relative to the position of the present vehicle.

Figure 15:
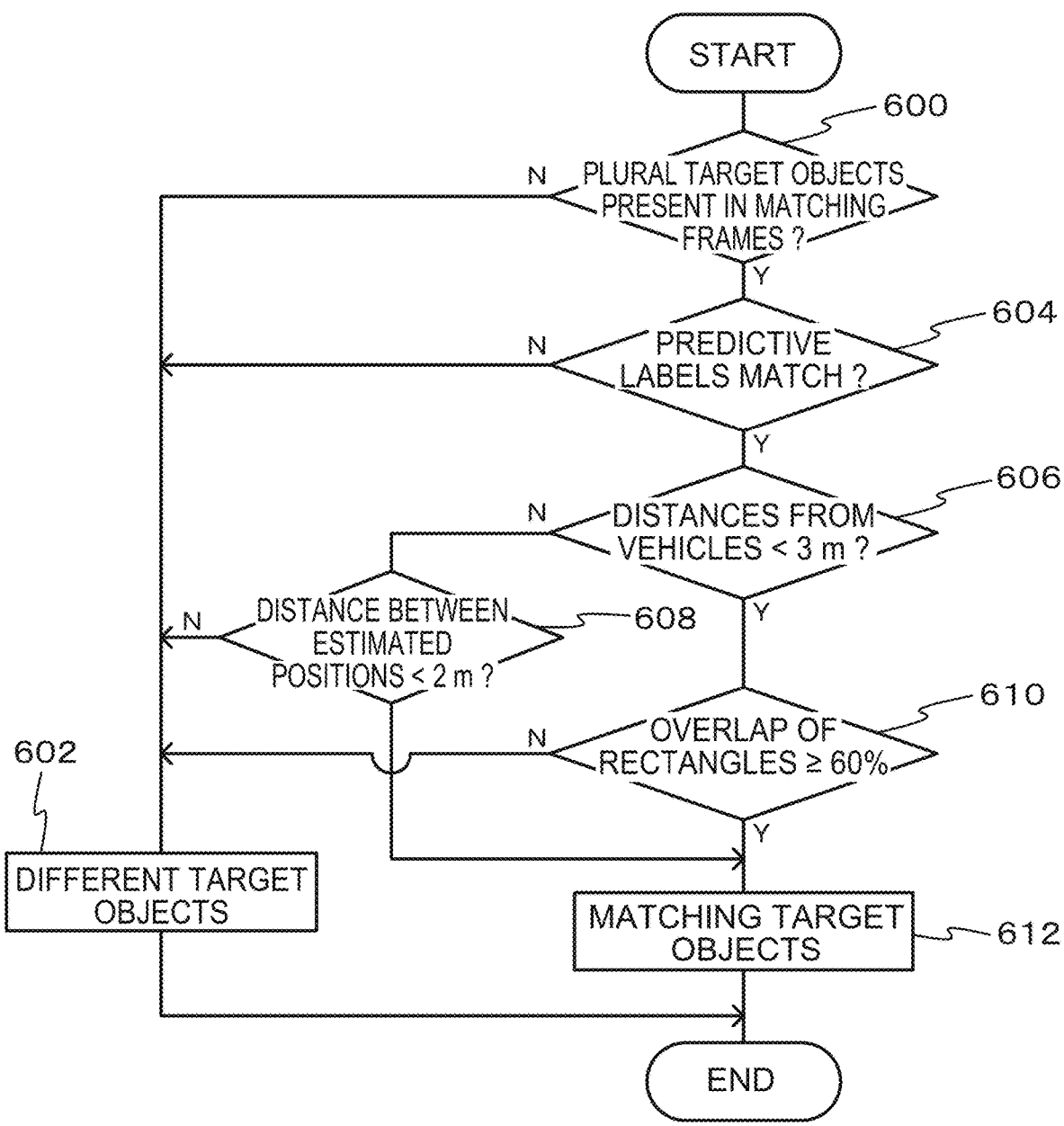
FIG. 15 is a flowchart showing a second example of the flow of matching target object integration processing that is carried out by the matching target object integration section.

Now, a second example of the matching target object integration processing is described. FIG. 15 is a flowchart showing the second example of the flow of the matching target integration processing carried out by the matching target object integration section 64. In contrast to the first example, the second example is a heuristic method.

In step 600, the matching target object integration section 64 makes a determination as to whether plural target objects are present in matching frames. When the result of this determination is negative, the matching target object integration section 64 proceeds to step 602, and when the result is affirmative, the matching target object integration section 64 proceeds to step 604.

In step 602, the matching target object integration section 64 judges that plural target objects within matching frames are different target objects, and the matching target object integration section 64 ends this sequence of processing.

Alternatively, in step 604, the matching target object integration section 64 makes a determination as to whether predictive labels are matching. This determination is a determination as to whether the types of target objects match based on recognition results from the image recognition section 50, for example, a determination as to whether sidewalk signs have the same messages. When the result of this determination is negative, the matching target object integration section 64 proceeds to step 602, and when the result is affirmative, the matching target object integration section 64 proceeds to step 606.

In step 606, the matching target object integration section 64 makes a determination as to whether distances from the vehicles are less than 3 m. This determination is a determination as to whether the distances between the vehicles and the detected target objects are less than 3 m. When the result of this determination is negative, the matching target object integration section 64 proceeds to step 608, and when the result is affirmative, the matching target object integration section 64 proceeds to step 610. Step 606 is a determination as to whether the distances are less than 3 m as an example, but the distance is not limited to 3 m; a pre-specified distance can be employed.

In step 608, the matching target object integration section 64 makes a determination as to whether a distance between estimated positions of the target objects is less than 2 m. This determination is a determination as to whether a distance between two detected target objects is less than 2 m. When the result of this determination is negative, the matching target object integration section 64 proceeds to step 602, and when the result is affirmative, the matching target object integration section 64 proceeds to step 612. Step 608 is a determination as to whether the distance is less than 2 m as an example, but the distance is not limited to 2 m; a pre-specified distance can be employed.

In step 610, the matching target object integration section 64 makes a determination as to whether an overlap of rectangles of the target objects is at least 60%. When the result of this determination is negative, the matching target object integration section 64 proceeds to step 602, and when the result is affirmative, the matching target object integration section 64 proceeds to step 612.

In step 612, the matching target object integration section 64 judges that the plural target objects in the matching frames are matching target objects, and the matching target object integration section 64 ends this sequence of processing. Thus, although matching target objects may be detected at different positions when position detection errors are large, target objects that are contained within a circle as illustrated in FIG. 14 may be judged to be matching and integrated.

In the exemplary embodiment described above, the first and second examples of the matching target object integration processing are described as separate processes. However, modes are possible in which the processes of the first example and the second example are carried out together. For example, the processing of the second example is performed and then the processing of the first example is performed thereafter.

In the exemplary embodiment described above, an example is described in which the functions of the image data collection section 40, the image recognition section 50 and the display information generation section 60 are provided at the single map generation server 12, but this is not limiting. For example, the functions may be divided between plural servers.

In the exemplary embodiment described above, when the estimation section 62 is estimating the position of a target object, the estimation section 62 estimates a relative position from the position of the vehicle 14 to the target object, and uses the position information of the vehicle 14 to estimate the position of a sidewalk sign as a latitude and longitude. However, a relative distance evaluation method is not limited thus. For example, when information from a vicinity monitoring device such as a radar apparatus or the like is included in the vehicle information, a relative distance detected by the vicinity monitoring device may be utilized. More specifically, a direction of the target object relative to a running direction of the vehicle is computed from the image information, and a relative distance between the vehicle and the target object is estimated by detecting a relative distance to the object in the computed direction.

The processing executed by the respective sections of the on-board device 16 and the map generation server 12 according to the exemplary embodiment described above is described as software processing that is implemented by a program being executed, but this is not limiting. For example, the processing may be carried out by hardware such as a graphics processing unit (GPU), application-specific integrated circuit (ASIC), field-programmable gate array (FPGA) or the like. Alternatively, the processing may combine both software and hardware. Further, when the processing is implemented in software, the program may be memorized in any of various non-transitory storage media and distributed.

The present disclosure is not limited by the above recitations. In addition to the above recitations, numerous modifications may be embodied within a technical scope not departing from the gist of the disclosure.

An object of the present disclosure is to provide a map generation device, a recording medium recording a map generation program that may add and update desired target objects on a pre-existing map and a map generation method.

A first aspect of the present disclosure is a map generation device that detects a pre-specified target object based on image information obtained by imaging from each of a plurality of vehicles; that estimates position information that is an absolute position of the detected target object, the position information being estimated based on a relative position of the detected target object and each vehicle imaging the image information in which the target object is detected, and position information that is an absolute position of each vehicle at a time of imaging the target object; and that integrates matching target objects included in a plurality of estimated target objects, the matching target objects being integrated based on the position information of the respective target objects and the image information of the images in which the respective target objects are included, and a number and positions of the target objects being specified.

According to the first aspect, pre-specified target objects are detected on the basis of image information obtained by imaging from each of the plural vehicles. For example, a deep learning technology for object detection is used to detect the target objects in the image information.

Position information that is an absolute position of each detected target object is estimated on the basis of position information that is the relative position of the detected target object and the vehicle imaging the image information in which the target object is detected and the absolute position of the vehicle at the time of imaging the target object.

On the basis of the position information of each target object of the plural estimated target objects and the image information of the images in which the respective target objects are contained, matching target objects included in the plural target objects are integrated. Hence, a number and positions of the target objects are specified. Thus, desired target objects may be added and updated on a pre-existing map.

A second aspect of the present disclosure is the map generation device of the first aspect, wherein the target objects are clustered by estimated positions of the estimated target objects and the number and positions of the target objects are specified based on differences between feature quantities of the target objects that are present in each cluster.

Thus, matching target objects may be integrated into a single target object and the number and positions of the target objects may be specified.

A third aspect of the present disclosure is the map generation device of the first aspect, wherein the target objects are clustered based on estimated positions of the estimated target objects and feature quantities of images of the target objects, and the number and positions of the target objects are specified based on feature quantity differences between the target objects that are present in each cluster.

Thus, matching target objects may be integrated into a single target object even when there are errors in the estimations.

A fourth aspect of the present disclosure is the map generation device of the first aspect, wherein the number and positions of the target objects are specified based on the position information of the estimated target objects, and in a case in which a plurality of the detected target objects in images represented by the image information, the number and positions of the target objects are specified as the matching target objects being: target objects of which the relative positions are less than a pre-specified distance and an overlap of the target objects in the images in which the target objects are detected is at least a pre-specified threshold, or target objects of which the relative positions are at least the pre-specified distance and a distance between the target objects is less than a pre-specified threshold.

Thus, desired target objects may be added and updated on a pre-existing map.

A fifth aspect of the present disclosure is the map generation device of any of the first to fourth aspect, further categorizes types of the detected target objects, wherein a number and positions of the categorized target objects of each type are specified.

Thus, desired target objects of the respective types may be added and updated on a pre-existing map.

A sixth aspect of the present disclosure is the map generation device of any of the first to fifth aspect, in a case in which the number and position of a target object have been specified from a number of the image information, the number being at least a pre-specified threshold, adds or removes information of the target object on a pre-existing map and updates the map.

Thus, mapping accuracy of the target objects may be improved compared to a situation in which a map is updated because of a single detection of a target object.

Aspects are applicable in which a map generation method or a storage medium storing a map generation program replaces the map generation system according to the first to sixth aspects.

The present disclosure may provide a map generation system and a storage medium storing a map generation program that may add and update desired target objects on a pre-existing map.

What is claimed is:

1. A map generation device comprising:
   a memory; and
   a processor being connected to the memory, the processor being configured to:
   detect a pre-specified target object based on image information obtained by imaging from each of a plurality of vehicles;
   estimate position information that is an absolute position of the detected target object, the position information being estimated based on
      a relative position of the detected target object and each vehicle imaging the image information in which the target object is detected, and
      position information that is an absolute position of each vehicle at a time of imaging the target object; and
   integrate matching target objects included in a plurality of estimated target objects, the matching target objects being integrated based on the position information of the respective target objects and the image information of the images in which the respective target objects are included, and a number and positions of the target objects being specified.

2. The map generation device according to claim 1, wherein the target objects are clustered by estimated positions of the target objects, and the number and positions of the target objects are specified based on differences between feature quantities of the target objects that are present in each cluster.

3. The map generation device according to claim 1, wherein the target objects are clustered based on estimated positions of the target objects and feature quantities of images of the target objects, and the number and positions of the target objects are specified based on feature quantity differences between the target objects that are present in each cluster.

4. The map generation device according to claim 1, wherein
   the number and positions of the target objects are specified based on the estimated position information of the target objects, and
   in a case in which a plurality of the target objects are detected in images represented by the image information, the number and positions of the target objects are specified as the matching target objects being:
      target objects of which the relative positions are less than a pre-specified distance and an overlap of the target objects in the images in which the target objects are detected is at least a pre-specified threshold, or
      target objects of which the relative positions are at least the pre-specified distance and a distance between the target objects is less than a pre-specified threshold.

5. The map generation device according to claim 1, the processor is further configured to categorize types of the detected target objects,
   wherein a number and positions of the target objects of each type that has been categorized are specified.

6. The map generation device according to claim 1, the processor is further configured to, in a case in which the number and position of a target object have been specified from a number of the image information, the number being at least a pre-specified threshold, add or remove information of the target object on a pre-existing map and update the map.

7. A non-transitory recording medium that records a program that is executable by a computer to perform a map generation processing, the map generation processing comprising:
   detecting a pre-specified target object based on image information obtained by imaging from each of a plurality of vehicles;
   estimating position information that is an absolute position of the detected target object, the position information being estimated based on a relative position of the detected target object and each vehicle imaging the image information in which the target object is detected, and position information that is an absolute position of each vehicle at a time of imaging the target object; and integrating matching target objects included in a plurality of estimated target objects, the matching target objects being integrated based on the position information of the respective target objects and the image information of the images in which the respective target objects are included, and a number and positions of the target objects being specified.

8. The non-transitory recording medium according to claim 7, wherein the target objects are clustered by estimated positions of the target objects, and the number and positions of the target objects are specified based on differences between feature quantities of the target objects that are present in each cluster.

9. The non-transitory recording medium according to claim 7, wherein the target objects are clustered based on estimated positions of the target objects and feature quantities of images of the target objects, and the number and positions of the target objects are specified based on feature quantity differences between the target objects that are present in each cluster.

10. The non-transitory recording medium according to claim 7, wherein the number and positions of the target objects are specified based on the estimated position information of the target objects, and in a case in which a plurality of the target objects are detected in images represented by the image information, the number and positions of the target objects are specified as the matching target objects being:

target objects of which the relative positions are less than a pre-specified distance and an overlap of the target objects in the images in which the target objects are detected is at least a pre-specified threshold, or target objects of which the relative positions are at least the pre-specified distance and a distance between the target objects is less than a pre-specified threshold.

11. The non-transitory recording medium according to claim 7, the map generation processing further comprising categorizing types of the detected target objects, wherein a number and positions of the target objects of each type that has been categorized are specified.

12. The non-transitory recording medium according to claim 7, the map generation processing further comprising, in a case in which the number and position of a target object have been specified from a number of the image information, the number being at least a pre-specified threshold, adding or removing information of the target object on a pre-existing map and updating the map.

13. A map generation method comprising:
by a processor,
detecting a pre-specified target object based on image information obtained by imaging from each of a plurality of vehicles;

estimating position information that is an absolute position of the detected target object, the position information being estimated based on a relative position of the detected target object and each vehicle imaging the image information in which the target object is detected, and position information that is an absolute position of each vehicle at a time of imaging the target object; and integrating matching target objects included in a plurality of estimated target objects, the matching target objects being integrated based on the position information of the respective target objects and the image information of the images in which the respective target objects are included, and a number and positions of the target objects being specified.

14. The map generation method according to claim 13, wherein the target objects are clustered by estimated positions of the target objects, and the number and positions of the target objects are specified based on differences between feature quantities of the target objects that are present in each cluster.

15. The map generation method according to claim 13, wherein the target objects are clustered based on estimated positions of the target objects and feature quantities of images of the target objects, and the number and positions of the target objects are specified based on feature quantity differences between the target objects that are present in each cluster.

16. The map generation method according to claim 13, wherein the number and positions of the target objects are specified based on the estimated position information of the target objects, and in a case in which a plurality of the target objects are detected in images represented by the image information, the number and positions of the target objects are specified as the matching target objects being:

target objects of which the relative positions are less than a pre-specified distance and an overlap of the target objects in the images in which the target objects are detected is at least a pre-specified threshold, or target objects of which the relative positions are at least the pre-specified distance and a distance between the target objects is less than a pre-specified threshold.

17. The map generation method according to claim 13, further comprising categorizing types of the detected target objects, wherein a number and positions of the target objects of each type that has been categorized are specified.

18. The map generation method according to claim 13, further comprising, in a case in which the number and position of a target object have been specified from a number of the image information, the number being at least a pre-specified threshold, adding or removing information of the target object on a pre-existing map and updating the map.

* * * * *